(12) United States Patent
Chevallier-Mames et al.

(10) Patent No.: US 9,774,443 B2
(45) Date of Patent: Sep. 26, 2017

(54) COMPUTING KEY-SCHEDULES OF THE AES FOR USE IN WHITE BOXES

(71) Applicant: Apple Inc., Cupertino, CA (US)

(72) Inventors: Benoit Chevallier-Mames, Paris (FR); Bruno Kindarji, Paris (FR); Thomas Icart, Paris (FR); Augustin J. Farrugia, Los Altos Hills, CA (US); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/639,026

(22) Filed: Mar. 4, 2015

(65) Prior Publication Data

US 2016/0261405 A1    Sep. 8, 2016

(51) Int. Cl.
H04L 9/06    (2006.01)
H04L 9/00    (2006.01)

(52) U.S. Cl.
CPC ............ H04L 9/0631 (2013.01); H04L 9/002 (2013.01); *H04L 2209/046* (2013.01); *H04L 2209/16* (2013.01); *H04L 2209/24* (2013.01); *H04L 2209/60* (2013.01)

(58) Field of Classification Search
None
See application file for complete search history.

(56) References Cited

U.S. PATENT DOCUMENTS

| | | | | |
|---|---|---|---|---|
| 5,949,884 A * | 9/1999 | Adams | ................ | H04L 9/0625 380/29 |
| 6,324,286 B1 * | 11/2001 | Lai | ................ | H04L 9/0625 380/29 |
| 6,769,063 B1 * | 7/2004 | Kanda | ................ | H04L 9/002 380/29 |
| 6,891,950 B1 * | 5/2005 | Oomori | ................ | H04L 9/0625 380/29 |
| 6,917,684 B1 * | 7/2005 | Tatebayashi | ................ | H04L 9/0625 380/37 |
| 7,142,673 B1 * | 11/2006 | Moldovyan | ................ | H04L 9/0618 380/28 |
| 7,848,515 B2 | 12/2010 | Dupaquis et al. | | |
| 8,144,865 B2 | 3/2012 | Teglia et al. | | |
| 8,699,702 B2 | 4/2014 | Farrugia et al. | | |
| 2003/0099352 A1 * | 5/2003 | Lu | ................ | H04L 9/0631 380/37 |
| 2004/0202318 A1 * | 10/2004 | Lu | ................ | H04L 9/0631 380/29 |

(Continued)

OTHER PUBLICATIONS

Karroumi, Mohamed, "Protecting White-Box AES with Dual Ciphers," Lecture Notes in Computer Science, Information Security and Cryptology—ICISC, Month Unknown 2010, pp. 278-291, vol. 6829, Springer-Verlag Berlin Heidelberg.

*Primary Examiner* — Peter Poltorak

(74) *Attorney, Agent, or Firm* — Blakely, Sokloff, Taylor & Zafman LLP

(57) ABSTRACT

Some embodiments provide a method for performing a cryptographic process. The method receives first and second cipher keys. The method generates a set of subkeys corresponding to each of the first and second cipher keys. The set of subkeys for the first cipher key is dependent on the first cipher key and the second cipher key. The method performs the cryptographic process by using the generated sets of subkeys.

20 Claims, 12 Drawing Sheets

(56) References Cited

U.S. PATENT DOCUMENTS

| | | | |
|---|---|---|---|
| 2008/0019503 A1* | 1/2008 | Dupaquis | H04L 9/0625 380/28 |
| 2008/0285745 A1* | 11/2008 | Teglia | H04L 9/003 380/29 |
| 2010/0054460 A1* | 3/2010 | Martinez | H04L 9/0618 380/28 |
| 2010/0202608 A1* | 8/2010 | Furuhashi | H04L 9/0894 380/44 |
| 2012/0207300 A1* | 8/2012 | Karroumi | H04L 9/0836 380/44 |
| 2014/0258708 A1* | 9/2014 | Shekhar | H04L 9/0861 713/155 |
| 2014/0328482 A1* | 11/2014 | Saito | H04L 9/002 380/28 |
| 2015/0006905 A1* | 1/2015 | Avanzi | H04L 9/0618 713/189 |
| 2015/0312226 A1* | 10/2015 | Michiels | H04L 63/0428 713/168 |
| 2016/0226658 A1* | 8/2016 | Howard | H04L 9/0637 |

\* cited by examiner

COMPUTING KEY-SCHEDULES OF THE AES FOR USE IN WHITE BOXES

BACKGROUND

Cryptographic algorithms are widely used for encryption of messages, authentication, encryption signatures and identification. The well-known DES (Data Encryption Standard) has been in use for a long time, and was updated by Triple-DES, which has been replaced in many applications by AES (Advanced Encryption Standard). AES is an approved encryption standard by the U.S. government. AES is a substitution permutation network, that is fast enough to execute in both computer software and hardware implementations, relatively easy to implement, and requires little memory space.

Implementations of AES do not provide much security against an attacker recovering a secret key, if the attacker has privileged access to the system implementing the cipher. However, AES is often used in potentially insecure environments. For instance, AES could be employed in a white box environment. In a white box model, it is presumed that an attacker has total access to the system performing an encryption, including being able to observe directly a state of memory, program execution, and so on. In such a model, an encryption key can be observed in or extracted from memory, and so ways to conceal operations indicative of a secret key are important. For example, the attacker can learn the secret key of an AES software implementation by observing the execution of the key scheduling algorithm.

Digital rights management (DRM) applications are one instance where it is desired to keep the attacker from finding the secret key even though the attacker has complete control of the execution process. "White-Box Cryptography and an AES Implementation", by Stanley Chow, Philip A. Eisen, Harold Johnson, Paul C. van Oorschot, in Selected Areas in Cryptography: $9^{th}$ Annual International Workshop, SAC 2002, PP. 250-270, gives a construction of the AES algorithm for such white box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

However, this solution does not solve all needs for block cipher's encryption. Indeed, the case where the key is derived through a given process and then unknown at the compilation time is not included. One typical use case is when a program is distributed over several users and each of them has their own key. In this case, it is from a practical point of view impossible to disseminate different code to each user. Another use case is when generating session keys (which are different for each session) through a given process. Of course, in this case the key is unknown at compilation time. Another use case is when it is necessary to store a large number of keys. However, it is not reasonable to consider storing around 700 KB for each key.

BRIEF SUMMARY

Some embodiments provide a method for performing a cryptographic process. The method receives first and second cipher keys. The method generates a set of subkeys corresponding to each of the first and second cipher keys. The set of subkeys for the first cipher key is dependent on the first cipher key and the second cipher key. The method performs the cryptographic process by using the generated sets of subkeys. The method in some embodiments is used to protect the keys of white box AES representations. The method provides security advantages over the methods that perform two independent white box key expansions. Since the subkeys of the second cipher key depend on the first cipher key, attacking the second key requires breaking both key schedules, which is not the case for two independent computations.

In addition, some embodiments apply linear transformations to the keys to protect the keys of white box AES representations. Furthermore, some embodiments generate key schedules protected by different linear functions P1 and P2. Using two different linear functions, P1 and P2, these embodiments protect K1 with P1 and K1⊕K2 with P2. Some embodiments also provide a method that generates sets of subkeys for more that two cipher keys, where the subkeys for each cipher key can depend on subkeys of one or more of the other cipher keys.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Conventional cryptography techniques were intended to protect confidential information from malicious attackers. The confidential data was protected from everyone except from the recipient. In environments such as DRM or client software running in the cloud, the receiving platform is controlled by potentially hostile end-users. In these environments, white-box cryptography techniques are required to prevent attackers from extracting the cryptographic keys and then redistribute the protected content.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Many more details of embodiments of the multi-block cryptographic operations will be discussed below. Section I provides a detailed discussion of AES as an example of a multi-round block cipher operation. Section II then describes scheduling two key schedules at the same time in some embodiments. Next, Section III describes extending the key scheduling to multiple key schedules. Finally, Section IV describes an electronic system with which some embodiments of the invention are implemented.

I. Description of AES

Before describing the computation of key schedules of some embodiments in further detail, an example of AES is described. Block ciphers are deterministic algorithms that operate on blocks of fixed-length data of input and generate same size blocks of output referred to as ciphertext. While one of ordinary skill in the art will recognize that the principles described in this specification are applicable to various different forms of block cipher, they are described in part by reference to the AES block cipher.

Figure 1:
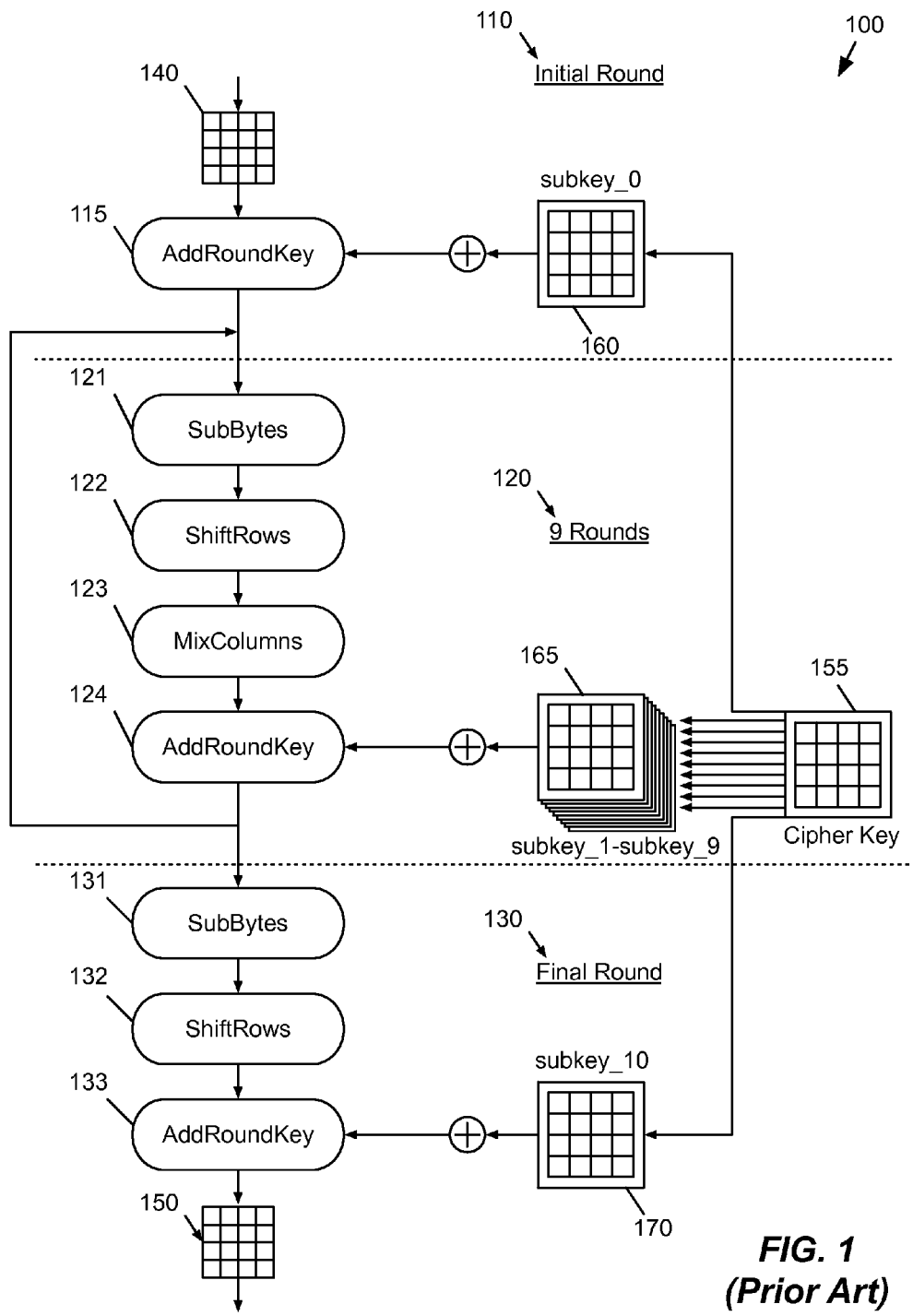
FIG. 1 provides a conceptual illustration of an example cryptographic operation according to the AES standard.

FIG. 1 provides a conceptual illustration of an example cryptographic operation 100 (e.g., an encryption or decryption operation) according to the AES standard. As shown, input data 140 is processed in an initial round 110, nine middle rounds 120, and a final round 130, to produce output state 150. For a decryption operation, the input data 140 is encrypted data (referred to as cipher text) and the output state 150 is decrypted data (which may be plain text, or cipher text in the case that the input data was encrypted multiple times). Similarly, for encryption, the input data 140 may be previously encrypted data or unencrypted data (cipher text or plain text), and the output data 150 is encrypted data (cipher text, which will be twice encrypted in the case that the input is also cipher text). The input data 140 can be any computer readable message (or, more accurately, a block of such a computer readable message). For instance, the input data 140 could be a portion of an encrypted content file, video content, image content, audio content, a computer message, a secure transmission, or any other string of values that can be encoded as bits.

In some embodiments, AES has a fixed block size of 128 bits and a key size of 128, 192 or 256 bits. Due to the fixed block size of 128 bits, AES operates on a 4×4 array of bytes (e.g., 16 bytes). Accordingly, the input data 140 is a 16-byte array of information, which may be a sub-portion of a larger message. For instance, a 3 megabyte audio file can be divided into 16 byte portions and each portion encrypted according to operation 100. During the operations of AES, the input data 140, as manipulated, may be referred to as "AES state". AES state is a 16-byte buffer upon which the AES operations are performed.

AES uses key expansion, and like most block ciphers, a set of encryption and decryption rounds (iterations). Each round involves similar processes. As shown in FIG. 1, the initial round 110, nine middle rounds 120, and final round 130 each includes similar operations (e.g., SubBytes, ShiftRows, MixColumns, and AddRoundKey). The entire AES encryption algorithm (e.g., operation 100) includes 11 AddRoundKey operations, 10 SubBytes operations, 10 ShiftRows operations, and 9 MixColumns operations. Preliminarily to operation 100, the original 16-byte cipher key 155 is expanded to 11 subkeys, during what is called a key scheduling operation. The 11 subkeys include subkey_0 160, subkey_1-subkey_9 165, and subkey_10 170. The eleven subkeys are each used in different rounds of operation 100. Each subkey is 16 bytes long, in some embodiments, to match the size of the AES state.

In the initial round 110, the cryptographic operation 100 receives input data 140 and performs AddRoundKey operation 115. The AddRoundKey operation 115 combines input data 140 with the subkey_0 155. Specifically, this operation 115 performs a logical exclusive disjunction operation (hereinafter "XOR") on subkey_0 155 and input data 140, in order to produce intermediate AES state.

Following the initial round 110, operation 100 performs nine middle rounds 120. Each of the nine middle rounds 120 includes four operations: SubBytes 121, ShiftRows 122, MixColumns 123, and AddRoundKey 124. The SubBytes operation 121 substitutes the bytes of the current AES state according to a substitution table. This substitution table is sometimes referred to as a substitution box or "S-BOX" table. This operation provides non-linearity in the cipher.

The ShiftRows operation 122 cyclically shifts bytes in each row of the AES state by certain offsets. As the AES state is a 4×4 16-byte array, the AES state can be arranged in a 4 row, 4 column arrangement. ShiftRows 122 will shift different rows of the 4×4 AES state by different amounts. For instance, in some embodiments, the first row is left unchanged, each byte of the second row is shifted one to the left, and the third and fourth rows are shifted by offsets of two and three respectively.

The MixColumns operation 123 combines bytes of the AES state from each column using an invertible linear transformation. The MixColumns operation 123 takes four bytes as input and outputs four bytes, where each input byte affects all four output bytes. The MixColumns operation may be implemented via a table lookup operation. Together with the ShiftRows operation, the MixColumns operation provides diffusion in the cipher.

The AddRoundKey operation 124 combines a round key from one of subkey_1-subkey_9 165 with the AES state, depending on the round, in the same manner as the AddRoundKey operation 115. For each round, a subkey is derived from cipher key 155. Each subkey is the same size as the AES state (e.g., a 4×4 16-byte array). The subkey is combined with the AES state using an XOR operation.

The cryptographic operation 100 performs nine such rounds on the AES state. Once the nine middle rounds 120 are completed, the operation 100 performs a final round 130, which includes a SubBytes operation 131, a ShiftRows operation 132, and an AddRoundKey operation 133. These final operations are the same as those described above in connection with the earlier rounds. The eleventh subkey_10 170 is combined with the AES state to produce output state 150.

The previous description of operation 100 corresponds to the order of operations required to encrypt content. Decryptions operations under AES are substantially similar, but the order of operations is reversed and inverses of the operations are used. The inverse of AddRoundKey is AddRoundKey itself. The inverse of SubBytes is Inverse SubBytes, which is another table look up operation. The inverse of MixColumns is Inverse MixColumns, which is also another lookup operation. The inverse of ShiftRows is Inverse ShiftRows, which is another move from one byte location to another. Different versions of AES (e.g., the 256-bit variant) can include different numbers of rounds and different key sizes. For further detail on AES, see the specification for the Advanced Encryption Standard (AES), National Institute of Standards and Technology (NIST), which can be found on the Internet.

A. The AES Key Schedule

A cipher key, K, of 16 bytes can be represented either in bytes (k0, . . . k15) or in 32-bit words (w0, w1, w2, w3). The key schedule of cipher key K for AES is defined as follows. The first subkey K[0] is equal to K. For i>0, the subkey K[i]=(w0[i], w1[i], w2[i], w3[i]) is derived from the previous subkey K[i−1]=(w0[i−1], w1[i−1], w2[i−1], w3[i−1]) in the following way:

$$w0[i]=w0[i-1] \oplus \text{SubWord}(\text{RotWord}(w3[i-1])) \oplus \text{Rcon}[i]$$

$$w1[i]=w1[i-1] \oplus w0[i]$$

$$w2[i]=w2[i-1] \oplus w1[i]$$

$$w3[i]=w3[i-1] \oplus w2[i]$$

where SubWord is the operation that applies the SubBytes function on all bytes that make a word. RotWord is the bit-wise rotation of the word by 8 bits to the left. Rcon[i] is a constant for the round i. The operator $\oplus$ is the bitwise logical exclusive disjunction referred to as "exclusive or" operator or "XOR" operator.

As can be seen, the only non-linear operation at work in the key schedule algorithm is the Subword instruction. This operation is applied only on 4 bytes out of each 16-byte subkey.

B. White Box Key Schedule and Encryption

In the case of white boxes with dynamic keys, inputs, outputs, and keys are supposed to be masked by constant (i.e., known at compilation time) or dynamic (i.e., depending on/linked to another input) value, denoted M in the following. In such cases, the AES key schedule is computed directly on the masked key K⊕M. The output is then the expanded subkeys K'[i]=K[i]⊕M'[i], where M' is a set of masks. The white box encryption and decryption algorithm ensures that the encryption and decryption occurs only on masked data at all time, to ensure the security of the data and the key involved. The key schedule is an initialization of the AES subkeys for each round. The secure key schedule is sometimes referred to as white box initialization.

II. Scheduling Two AES Keys at Once

The above describes the standard, most basic form of AES. Other block ciphers follow similar types of processes. In a non-white box environment (e.g., on a secure server to which the public does not have access), the basic form of AES can generally be used without too much concern. However, in a white box environment (e.g., on a user device, the memory of which can be examined during the cryptographic process by a sophisticated user), additional protections to obfuscate the cryptographic process are often desired.

There are applications of cryptographic software that require managing several keys at once for encryption or decryption. For example, a proxy re-encryption scheme takes as input some data encrypted with a first key, and outputs the same data, but encrypted with a second key. Another example is a stream that is encrypted by multiple keys, and must therefore be decrypted with multiple keys. The stream is encrypted either sequentially (the stream is encrypted by a key K1, and then the encrypted stream is encrypted by another key K2), or in parallel (with two different keys used to encrypt different parts of the stream). Both keys are considered as masked each with a specific mask.

A. Representation of Two Masked Keys

Some embodiments provide a method for computing the expansion of two keys without revealing them. In the following discussions, K1 and K2 are two 16-byte keys, with K1[i] and K2[i] being the scheduled keys for round i, which are used in AES encryption or decryption methods. The goal of the white box initialization is to compute the schedules K'1 and K'2, defined as:

$$K'1[i]=K1[i] \oplus M\text{out}1[i]$$

$$K'2[i]=K2[i] \oplus K1[i] \oplus M\text{out}2[i]$$

where the Mout1[i] and Mout2[i] are output masking values and $\oplus$ is bitwise "exclusive or" operation. For instance, Mout1 and Mout2 are each an array of constants, each constant used to mask a corresponding round i subkey.

Figure 2:
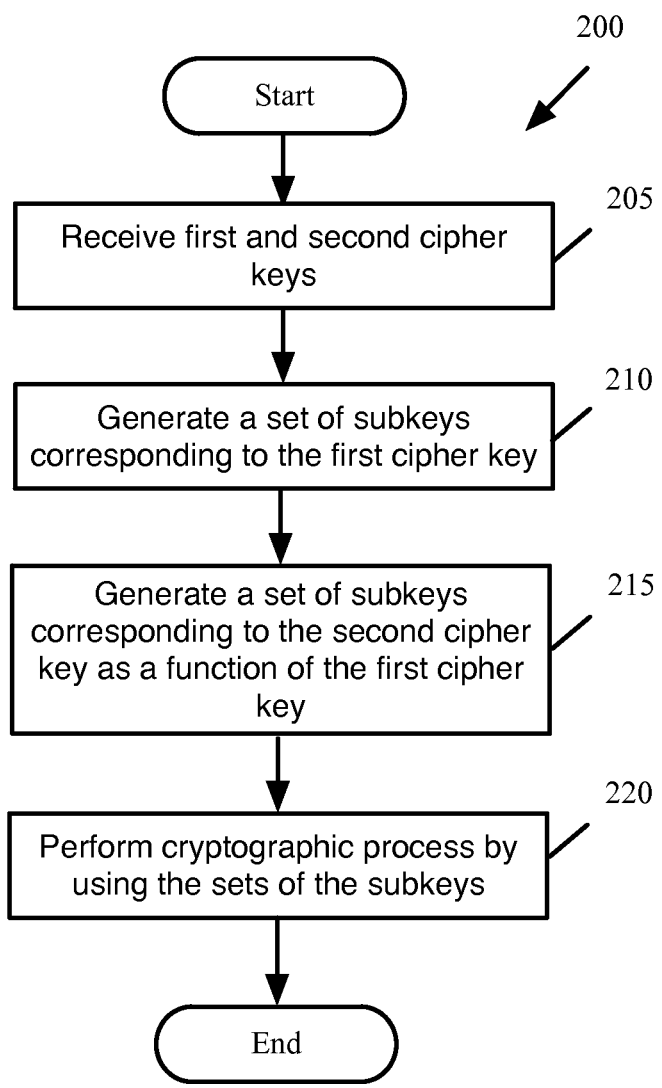
FIG. 2 conceptually illustrates a process for generating subkeys in some embodiments of the invention where at least one of the subkeys is dependent on the other subkey.

FIG. 2 conceptually illustrates a process 200 for generating subkeys in some embodiments of the invention where at least one of the subkeys is dependent on the other subkey. As shown, the process receives (at 205) a first cipher key and a second cipher key. In some embodiments, the process receives the first and second keys as masked values. For instance, the process in some embodiments receives a first input that includes K1⊕Min1, where K1 is the first cipher key and Min1 is an input mask. The process in some embodiments also receives a second input that includes K1⊕K2⊕Min2, where K2 is the second cipher key and Min2 is an input mask.

The process then generates (at 210) a set of subkeys for the first cipher key. The set of subkeys of the first cipher key includes one subkey for each cryptographic round. Each subkey of the first cipher key is dependent on the first cipher key and/or a subkey of the first cipher key from a previous round.

The process then generates (at 215) a set of subkeys for the second cipher key. The set of subkeys of the second cipher key includes one subkey for each cryptographic round. Each subkey of the second cipher key is dependent on the first cipher key and/or a subkey of the first cipher key from a previous round. In addition, each subkey of the second cipher key is dependent on the second cipher key and/or a subkey of the second cipher key from a previous round. The process then performs (at 220) cryptographic process by using the set of subkeys for the first and second cipher keys. The process then ends. Several more detailed embodiments are described below.

Some embodiments generate subkeys for two cipher keys using a process for which the input, output, and pseudocode are shown below. As shown, the first cipher key (and its derived values) are used both in computation of the subkeys for the first cipher key and the subkeys for the second cipher key.

The inputs to the process are as follows:

$$A1=K1 \oplus \text{Min}1$$

$$A2=K1 \oplus K2 \oplus \text{Min}2$$

where K1 is the first cipher key, K2 is the second cipher key, Min1 is a first masking value and Min2 is a second masking value.

Output:

$$K'1[0], \ldots K'1[10]$$

$$K'2[0], \ldots K'2[10]$$

where K'1[$i$] (0≤i<10) is round i subkey for the first cipher key and K'2[$i$] (0≤i<10) is round i subkey for the second cipher key.
Pseudocode:

```
K'1[0] = A1 ⊕ (Min1 ⊕ Mout1[0])
K'2[0] = A2 ⊕ (Min2 ⊕ Mout2[0])
For i in [1, 10]:
    K'1[i] = KeygenAssist (K'1[i−1], Mout1[i−1], Mout1[i], Rcon[i])
    K'2[i] = K'2[i−1] ⊕ KeygenRecombine (K'1[i−1], K'2[i−1],
    Mout1[i−1], Mout2[i−1]) ⊕ (Mout2[i] ⊕ Mout2[i−1])
```

In the above pseudocode, the Mout1[$i$] and Mout2[$i$] are output masking values. For instance, Mout1 and Mout2 are each an array of constants, each constant used to mask a corresponding round i subkey. Since A1 is equal to K1⊕Min1, the operation K'1[0]=A1⊕(Min1⊕Mout1[0]) is equivalent to K1⊕Mout1[0], which in effect removes Min1 mask and masks K1 with Mout1[0] without revealing K1. Similarly, since A2 is equal to K1⊕K2⊕Min2, the operation K'2[0]=A2⊕(Min2⊕Mout2[0]) is equivalent to K1⊕K2⊕Mout2[0], which in effect removes Min2 mask and applies Mout2[0] mask without revealing K1 or K2. After inserting K2'[0] into the above "for loop", K'2[$i$] will depend on is K1[$i$]⊕K2[$i$]⊕Mout2[$i$]. K'2[$i$] is, therefore, referred to herein as the differential key since it is based on the "exclusive or" of K1[$i$] and K2[$i$]).

The function KeygenAssist (previous_key, mask_out_prev_round, mask_out_curr_round, Rcon_i) is the function that iterates the key schedule function with input and output masks. KeygenAssist is used to generate the subkeys for the first cipher key. The pseudocode corresponding to KeygenAssist function is as follows:

```
KeygenAssist (previous_key, mask_out_prev_round,
mask_out_curr_round, Rcon_i):
    (w0, w1, w2, w3) = previous_key
    (y0, y1, y2, y3) = mask_out_prev_round
    (z0, z1, z2, z3) = mask_out_curr_round
    w'0 = w0 ⊕ SubWord (RotWord (w3 ⊕ y3)) ⊕ Rcon_i ⊕
    y0 ⊕ z0
    w'1 = w1 ⊕ w'0 ⊕ y1 ⊕ z1 ⊕ z0
    w'2 = w2 ⊕ w'1 ⊕ y2 ⊕ z2 ⊕ z1
    w'3 = w3 ⊕ w'2 ⊕ y3 ⊕ z3 ⊕ z2
    Output (w'0, w'1, w'2, w'3)
``` where w0, w1, w2, w3 are 4-bytes words and the operation (w0, w1, w2, w3)=previous_key denotes decomposing of the previous_key into 4 4-bytes words.

Figure 3:
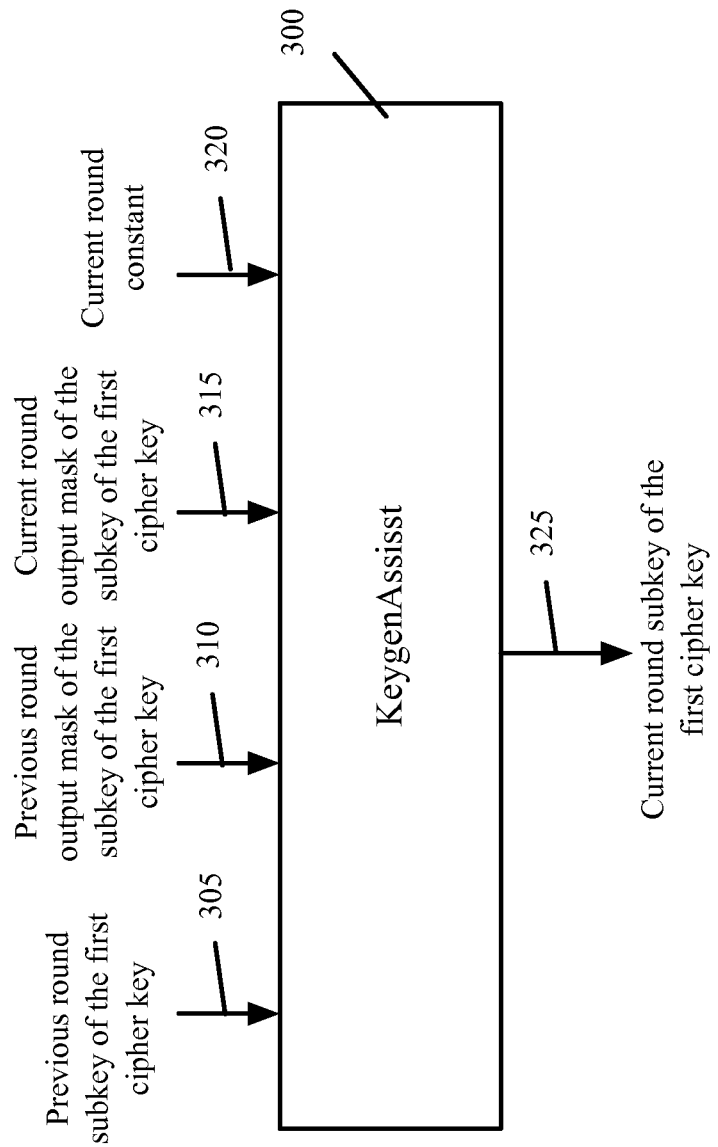
FIG. 3 illustrates the inputs and output of the KeygenAssist function.

FIG. 3 illustrates the inputs and output of the KeygenAssist function. As shown, the KeygenAssist function 300 receives the previous round subkey 305 of the first cipher key, the previous round output mask 310 of the first cipher key, the current round output mask 315 of the first subkey, and the current round constant 320, i.e., the current round Rcon. The KeygenAssist function 300 generates the current round subkey 325 of the first cipher key.

Figure 4A:
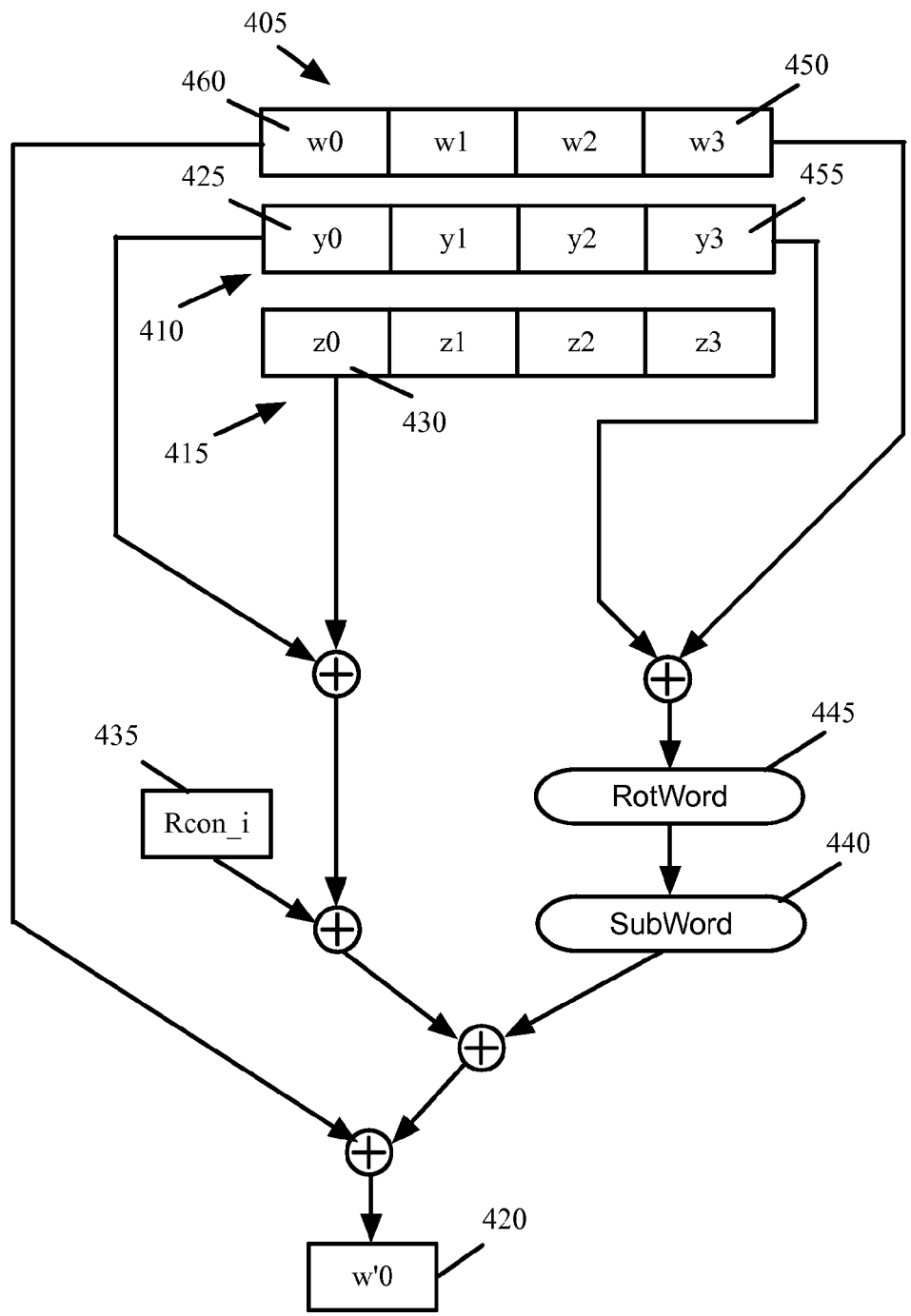
FIGS. 4A-4D conceptually illustrate one implementation of KeygenAssist function.

FIGS. 4A-4D conceptually illustrate one implementation of KeygenAssist function. KeygenAssist function in each round uses portions of the subkey 405 generated in the previous round, portions of Mout1 410 used in the previous round (i.e., Mout1[$i$−1]) and portions of Mout1 415 of the current round (i.e., Mout1[$i$]) to generate the subkey of the first cipher key for the current round. As shown in FIG. 4A, the XOR of y0 425 and z0 430 are generated. The result is XORed with Rcon_i 435, which is the 4-byte constant used for the current round. The result is XORed with the output of SubWord function 440. The result is XORed with the 4-byte word w0 460 to generate the 4-byte word w'0 of the current round subkey for the first cipher key.

SubWord operation applies the SubBytes function on all bytes that make a word (in the example of FIG. 4A, a 4-byte word that is the output of RotWord operation 445). The output of SubWord operation 440 is generated as follows. The XOR of the 4-byte word w3 450 and the 4-byte word y3 455 is generated. The result is the input to RotWord operation 445. RotWord is the bit-wise rotation of the word by 8 bits to the left. The result is input to SubWord operation 440.

Figure 4B:
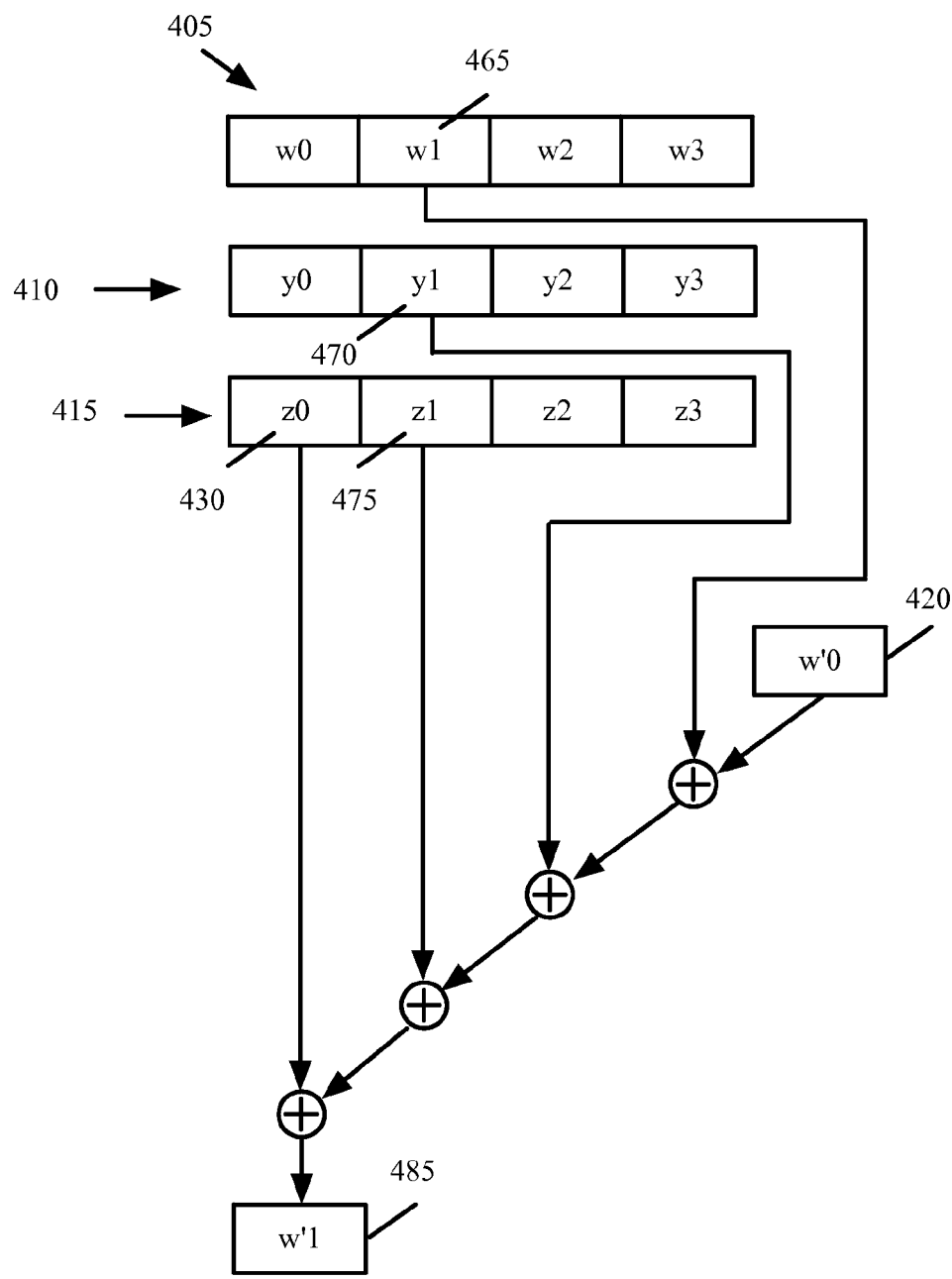

FIG. 4B shows generation of another 4-byte word, w'1 of the first cipher key by using the KeygenAssist function. As shown, the XOR of w'0 420 (generated in FIG. 4A) with w1 465 is generated. The result is then XORed with y1 470. The result of this operation is in turn XORed with z1 475. Finally, the result of this operation is XORed with z0 430 to generate w'1 485.

Figure 4C:
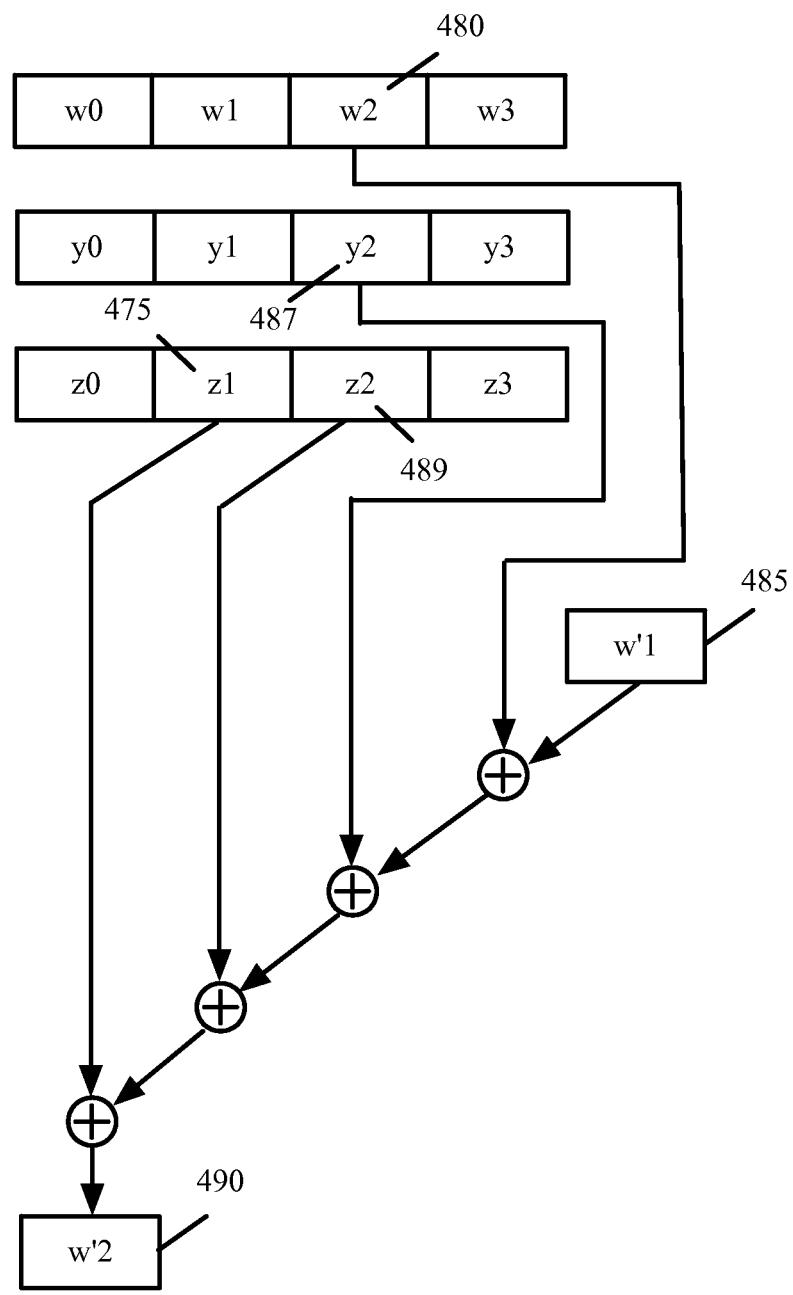

FIG. 4C shows generation of another 4-byte word, w'2 of the first cipher key by using the KeygenAssisst function. As shown, the XOR of w'1 485 (generated in FIG. 4B) with w2 480 is generated. The result is then XORed with y2 487. The result of this operation is in turn XORed with z2 489. Finally, the result of this operation is XORed with z1 475 to generate w'2 490.

Figure 4D:
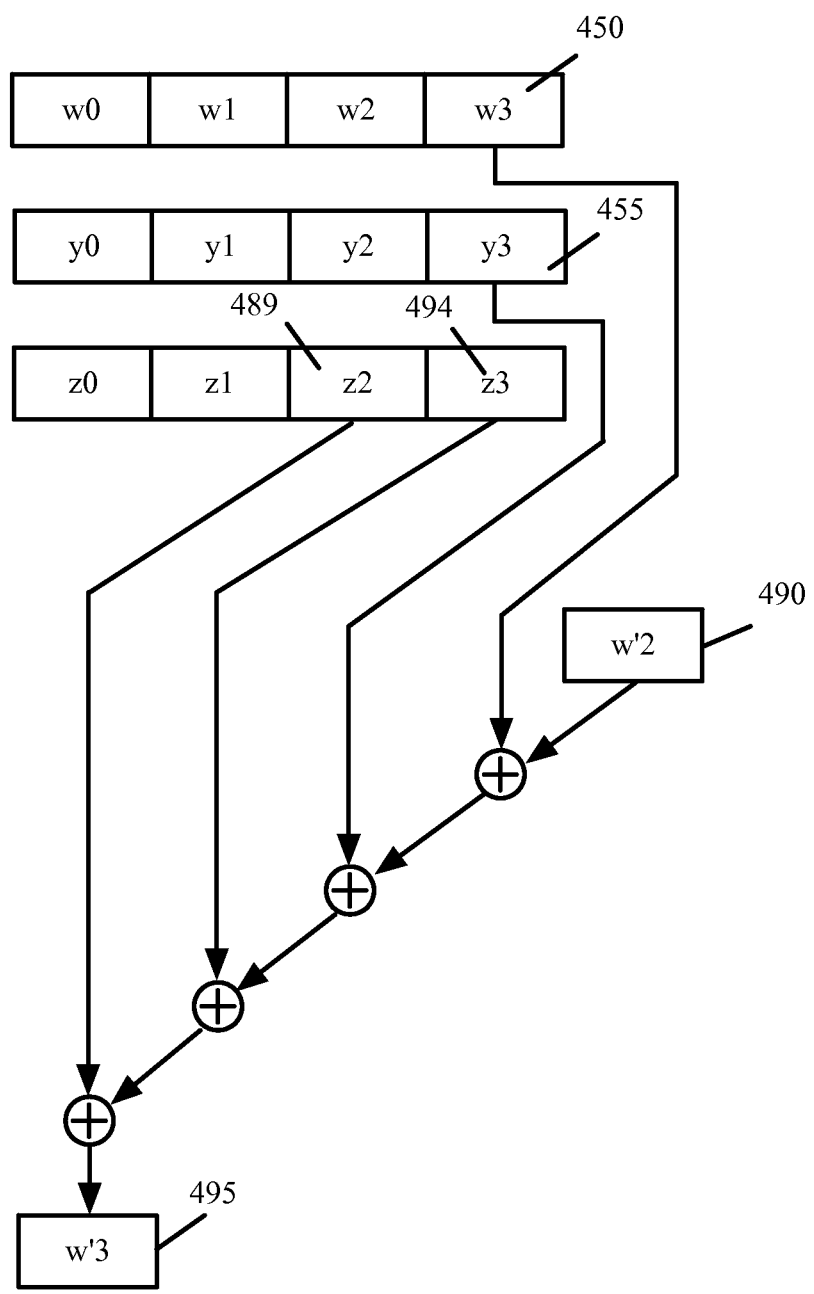

FIG. 4D shows generation of another 4-byte word, w'3 of the first cipher key by using the KeygenAssisst function. As shown, the XOR of w'2 490 (generated in FIG. 4C) with w3 450 is generated. The result is then XORed with y3 455. The result of this operation is in turn XORed with z3 494. Finally, the result of this operation is XORed with z2 489 to generate w'3 495.

The function KeygenRecombine (prev_key1, prev_key_diff, mask_out1_prev_round, mask_out_diff_prev_round) is another function that contains non-linearity in the AES key schedule. KeygenRecombine is used to generate the subkeys for the second cipher key. The pseudocode corresponding to KeygenRecombine function is as follows:

```
KeygenRecombine (prev_key1, prev_key_diff,
            mask_out1_prev_round,
            mask_out_diff_prev_round):
    (w0, w1, w2, w3) = prev_key1
    (x0, x1, x2, x3) = prev_key_diff
    (y0, y1, y2, y3) = mask_out1_prev_round
    (z0, z1, z2, z3) = mask_out_diff_prev_round
    x'0 = x0 ⊕ SubWord (RotWord (w3 ⊕ y3)) ⊕ SubWord
    (RotWord (w3 ⊕ x3 ⊕ y3 ⊕ z3))
    x'1 = x1 ⊕ z0
    x'2 = x2 ⊕ z1
    x'3 = x3 ⊕ z2
    Output (x'0, x'1, x'2, x'3)
```

Comparing to KeygenAssist function, the function KeygenRecombine has one additional operation SubWord (RotWord). This is the only place where some values of the differential key (which depends on the second cipher key) can be exposed, and as can be seen from the pseudocode above, only 4 Bytes out of the 16 Bytes that make the key are revealed. In order to calculate SubWord (RotWord (w3⊕x3⊕y3⊕z3)), the operations w3⊕x3⊕y3⊕z3 will be computed in some registers of the computer that is implementing the algorithm. This will only expose one word (i.e., word x3) of the differential key to a potential attack. Therefore, no matter what the security mechanism for calculating subkeys of K1 is, the novel function KeygenRecombine disclosed herein, only reveals 4 bytes of each K2'[i] subkey, which is not sufficient to compute the full K2'[i] subkey by an attacker.

Also, SubWord (RotWord) operation is part of the KeygenAssist function. It is, therefore, easy to re-use this function in the KeygenRecombine method, to keep these 4 Bytes still masked. There are several ways to implement SubWord in such a way that it keeps masks on values. Using one of these implementations, the computations will remain masked during the whole process of key scheduling. The RotWord function is linear and is thus directly compatible with mask preservation.

Figure 5:
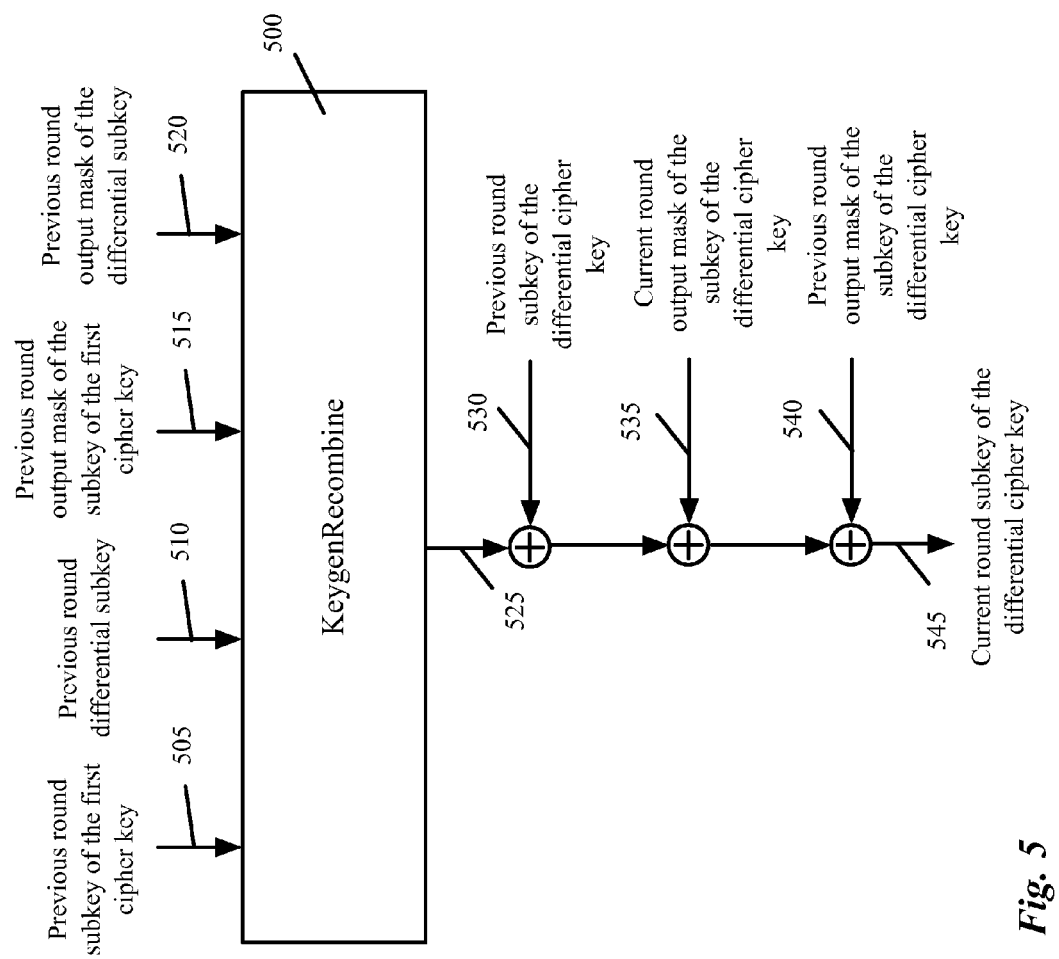
FIG. 5 illustrates the inputs and output of the KeygenRecombine function.

FIG. 5 illustrates the inputs and output of the KeygenRecombine function. As shown, the KeygenRecombine function 500 receives the previous round subkey 505 of the first cipher key, the previous round differential subkey 510, the previous round output mask 515 of the first cipher key, and the previous round output mask 520 of the differential subkey.

The term "differential key" or "differential subkey" herein refers to the "exclusive or" of two keys. For instance, the "previous round differential subkey" is the e"xclusive or" of "the previous round subkey of the first cipher key" and the "previous round subkey of the second cipher key". As described above, the differential subkey for the first round is the masked subkey K'2[0]:

$$K'2[0]=A2 \oplus (Min2 \oplus Mout2[0])=K1 \oplus K2 \oplus Mout2[0]$$

and K'2[i] for each subsequent round is defined as:

$$K'2[i]=K'2[i-1] \oplus \text{KeygenRecombine}(K'1[i-1],K'2[i-1],Mout1[i-1],Mout2[i-1]) \oplus (Mout2[i] \oplus Mout2[i-1])$$

The output 525 of KeygenRecombine function 500 is XORed with the previous round subkey 530 of the differential cipher key. The result is XORed with the current round output mask 535 of the differential subkey. The result is then XORed with the previous round output mask 540 of the differential subkey mask to generate the current round subkey 545 of the differential cipher key.

FIGS. 6A-6D conceptually illustrate one implementation of KeygenRecombine function. KeygenRecombine function in each round uses portions of the subkey 405 of the first cipher key generated in the previous round, portions of the differential subkey 605 generated in the previous round, portions of Mout1 410 used in the previous round (i.e., Mout1[i−1]) and portions of Mout2 610 used in the previous round (i.e., Mout2[i−1]) to generate 4 4-byte words x'0, x'1, x'2, and x'3, which are used (as shown in the above pseudocode) to generate the current round subkey K'2[i] for the differential cipher key.

Figure 6A:
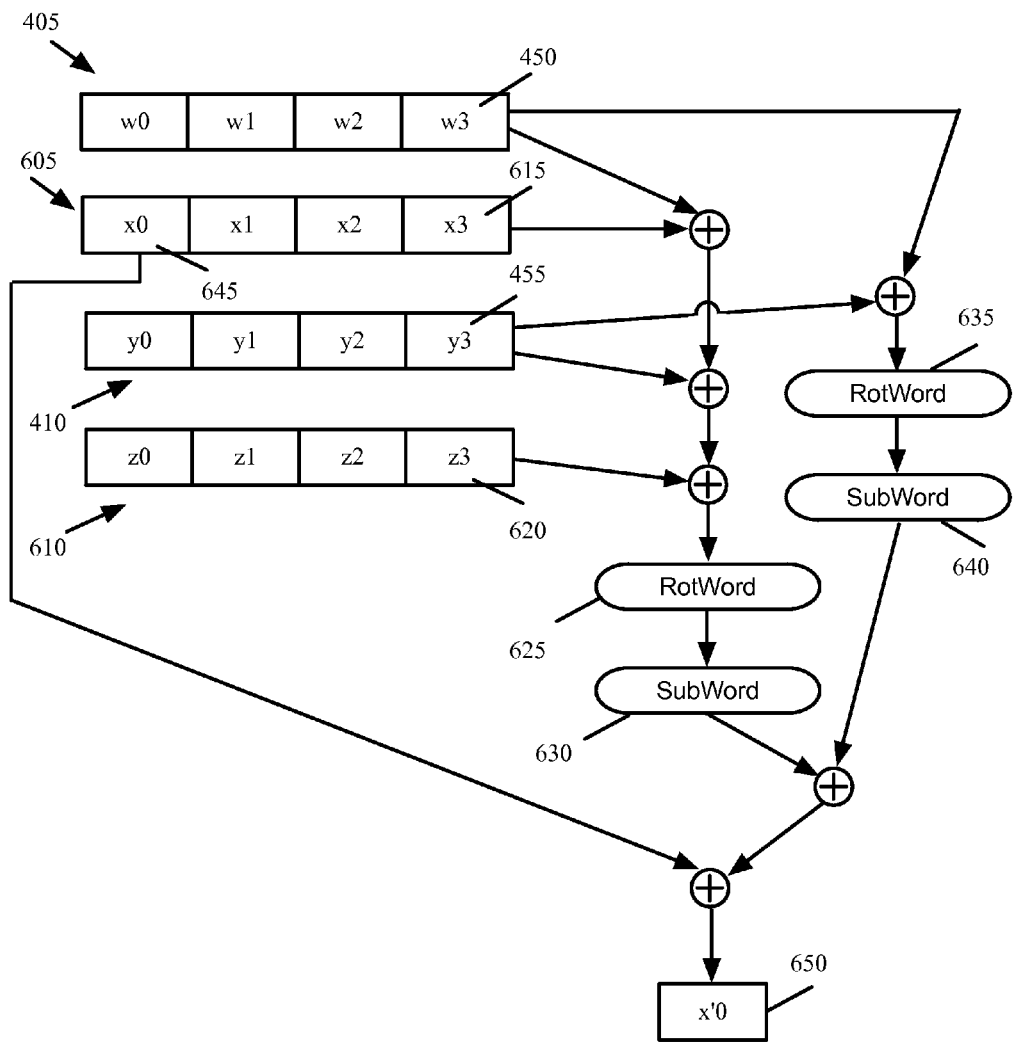
FIGS. 6A-6D conceptually illustrate one implementation of KeygenRecombine function.

As shown in FIG. 6A, the XOR of w3 450 and x3 615 are generated. The result is XORed with y3 455. The result is XORed with z3 620. The result is the input to RotWord operation 625, which bit-wise rotates the word by 8 bits to the left. The result is input to SubWord operation 630.

FIG. 6A also shows that the XOR of w3 450 and y3 455 are generated and the result is input to RotWord operation 635. The result is input to SubWord operation 640. The output of SubWord operation 640 is XORed with the output of SubWord operation 630. The result is XORed with the 4-byte word x0 645 to generate the 4-byte word x'0, 650 which is used to generate the current round subkey for the differential cipher key.

Figure 6B:
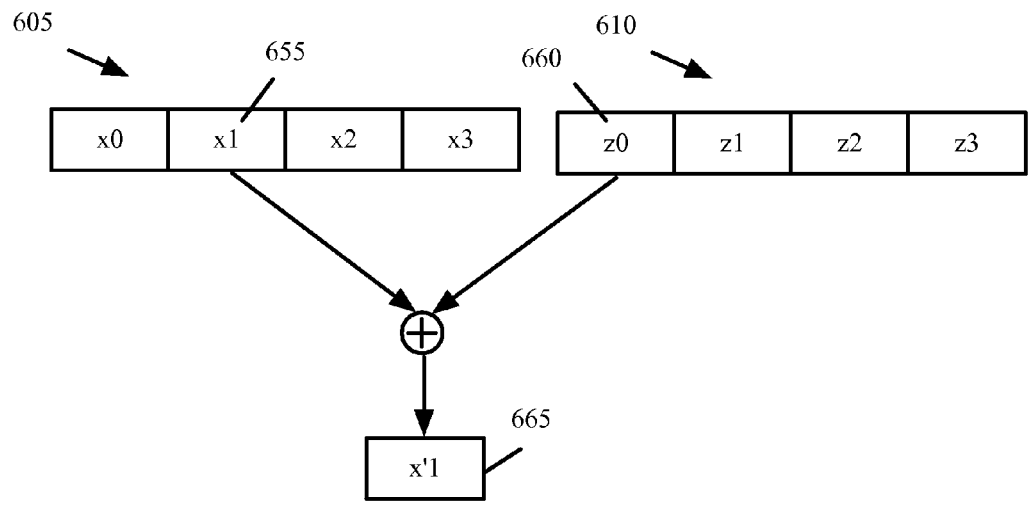

FIG. 6B shows the use of the KeygenRecombine function for generation of another 4-byte word, x'1, which is used to generate the differential cipher key. As shown, x'1 665 is generated by performing the XOR operation between x1 655 and z0 660.

Figure 6C:
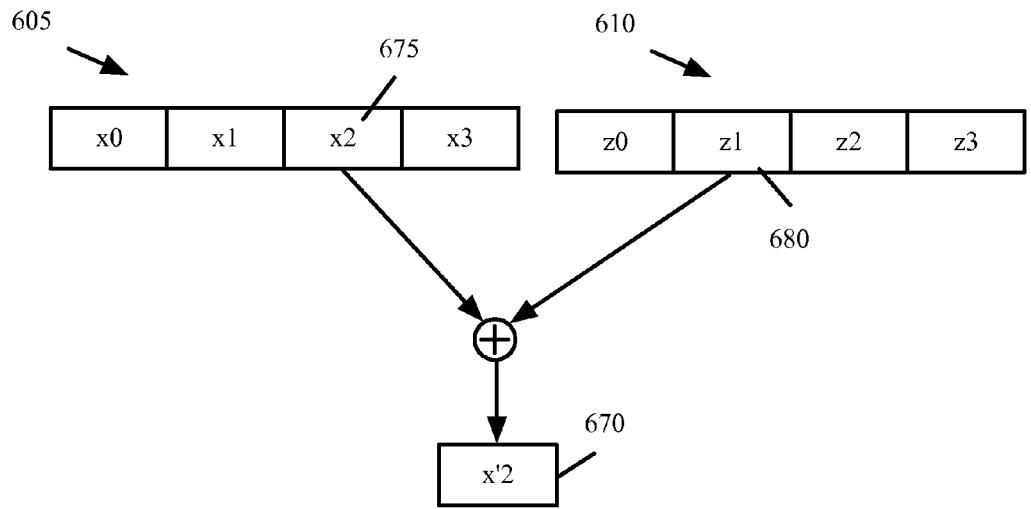

FIG. 6C shows the use of the KeygenRecombine function for generation of another 4-byte word, x'2, which is used to generate the differential cipher key. As shown, x'2 670 is generated by performing the XOR operation between x2 675 and z1 680.

Figure 6D:
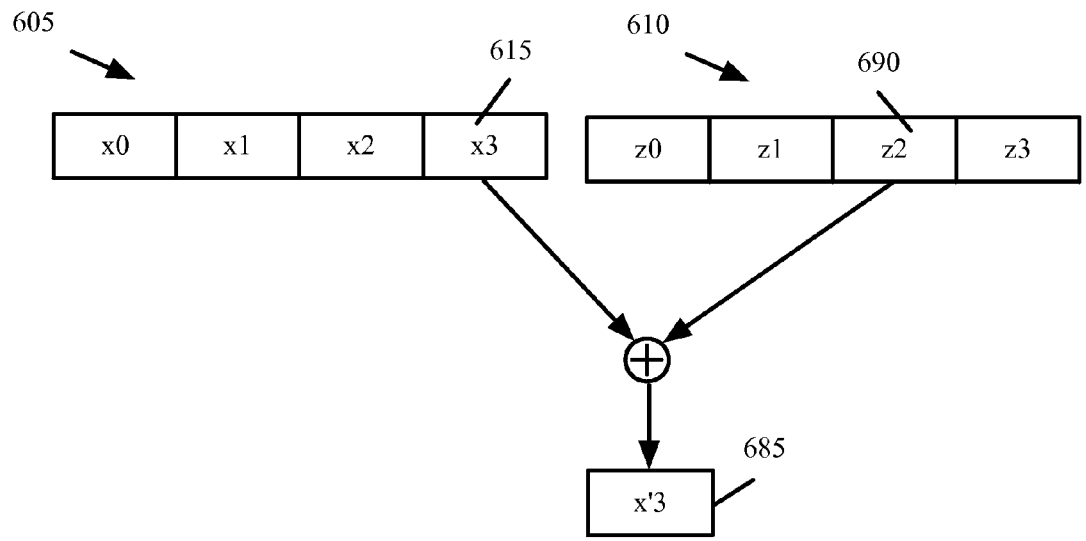

FIG. 6D shows the use of the KeygenRecombine function for generation of another 4-byte word, x'3, which is used to generate the differential cipher key. As shown, x'3 685 is generated by performing the XOR operation between x3 615 and z2 690.

B. Adding Linear Transformation on the Key Schedule

Since all operations involving the key in the AES encryption and decryption methods are linear, some embodiments apply linear transformations (denoted P, below) to the keys to protect the keys of white box AES representations. P is a function from $\{0,1\}^{}8$ to $\{0,1\}^{}8$ (i.e. from the set of bytes into itself), where "$\{0,1\}$" is a set made of two elements 0 and 1. The operator ** denotes the "power to" operation. The function P has the following properties (by definition of a linear transformation):

$$\text{For all bytes } x,y, P(x) \oplus P(y)=P(x \oplus y)$$

P is bijective, and has as inverse InvP, such that for all x, InvP(P(x))=x

A bijective function is a function that provides one-to-one correspondence between the elements of two sets where every element of one set is paired with exactly one element of the other set and vice versa. Since P is linear, it is quite trivial to generate the key schedules K"1 and K"2 defined as P(K'1) and P(K'2) (here the application of P is meant Byte per Byte) using the exact same method as the one described in the previous section (i.e., by replacing K'1 with K"1 and K'2 with K"2 in the above pseudocodes).

To compute such key schedules, the only thing to replace is the following. First, apply P on the first round keys K'1[0], K'2[0] (since the first round key is the key itself). Second, replace all occurrences of the SubWord functions by P(SubWord(InvP( )). This method enables having linear transformations applied to the key directly on both K1 and K2 key schedules. In other words, instead of computing K'1, K"1=P (K'1) is computed. Similarly, instead of computing K'2, K"2=P(K'2) is computed.

C. Complex Combinations of Key Schedules

The previous sections described how to generate in a masked way the key schedules of K'1 and K'2, and to have it protected by a linear function P. Some embodiments generate key schedules protected by different linear functions P1 and P2. Using two different linear functions, P1 and P2, these embodiments protect K1 with P1 and K1⊕K2 with P2. The following modifications are done on the methods described in the previous sections.

First, the function P1 is applied to K'1[0], and P2 is applied to K'2[0]. Second, the KeygenAssist function is modified (as in the previous section) by replacing the calls to SubWord( ) with calls to SubWord_WithP1( )=P1(SubWord(InvP1( )). Third, KeygenRecombine is replaced by the following function:

```
KeygenRecombineWithLinear (prev_key1, prev_key_diff):
    (w0, w1, w2, w3) = prev_key
    (x0, x1, x2, x3) = prev_key_diff
```

-continued

```
z0 = x0 ⊕ SubWord_WithP1andP2 (RotWord (w3) ) ⊕
          SubWord_WithP1andP2 (RotWord (w3 ⊕ P1
          (InvP2 (x3) ) ) )
z1 = x1 ⊕ z0
z2 = x2 ⊕ z1
z3 = x3 ⊕ z2
Output (z0, z1, z2, z3)
```

P1(InvP2) is a transition function from one protection to the other, and as such is also an acceptable linear function. P1(InvP2) is applied byte per byte. The SubWord_WithP1andP2 function is the function P2(SubWord(InvP1)), which is similar to the SubWord_WithP1 function.

For clarity reasons, the use of masks was not explicitly mentioned in this section. However, once the P1 and P2 linear functions are applied to protect K1 and K2, one can apply masks Mout1 and Mout2 on respectively P1(K1) and P2 (K1⊕K2).

III. Extension to Multiple Key Schedules

The previous sections described how to compute two key expansions at once. Some embodiments also provide expansion to n keys, where n is an arbitrary number. The techniques described in previous sections can be extended to key scheduled defined as by equations (1) to (4), where n is greater than 2:

$$K'n = Kn \oplus Kn-1 \oplus \ldots K2 \oplus K1 \quad (1)$$

$$K'n = Pn(Kn \oplus Kn-1 \oplus \ldots K2 \oplus K1) \quad (2)$$

$$K'n = Kn \oplus Kj \text{ for a given } j \text{ and } n \quad (3)$$

$$K'n = Pn(Kn \oplus Kj) \quad (4)$$

The method to implement the first two options (1) and (2) is to apply the previous section and do a recursive call. First, the key schedule for K1 and K2⊕K1 are determined as described in the previous sections. Then, the key schedule for K2⊕K1 and K3⊕K2⊕K1 is determined by making a recursive call to the same functions by replacing K1 with K2⊕K1 and K2⊕K1 with K3⊕K2⊕K1. This is recursively continued until the key schedule for K'n is determined.

The method to implement the last two options (3) and (4) is straightforward from the previous section, and recursive calls. In these methods, Kn is protected by Kj and (depending on the values of n and j) Kn+1 is protected by Kj+1, etc. The same functions as described in previous sections are utilized by replacing K1 with Kj and K2⊕K1 with Kn⊕Kj.

Some embodiments utilize the same techniques to have more complex and codependent key schedules computed. For instance, suppose P1 and P2 are two linear functions, such that P1+P2 is an invertible linear function and:

$$K'1 = P1(K1) \oplus P2(K2)$$

$$K'2 = P2(K1) \oplus P1(K2)$$

where K'1 and K'2 are the key schedules to compute, out of the keys provided in a similar way. As can be seen, K'1 is dependent on both K1 and K2. Similarly, K'2 is dependent on both K1 and K2. The disclosed embodiments enable to compute key schedules for K'1 and K'2 by simply replacing the non-linear part SubWord with the appropriate function as described below.

The previous sections used the following equations:

$$K'1 = K1$$

$$K'2 = K1 \oplus K2$$

which are equivalent to:

$$K1 = K'1$$

$$K2 = K'1 \oplus K'2$$

with the codependent key, the following equations are used:

$$K'1 = P1(K1) \oplus P2(K2) = F1(K1, K2)$$

$$K'2 = P2(K1) \oplus P1(K2) = F2(K1, K2)$$

which are equivalent to:

$$K1 = (P1 \oplus P2)^{-2}(P1(K'1)) \oplus (P1 \oplus P2)^{-2}(P2(K'2)) = G1(K'1, K'2)$$

$$K2 = (P1 \oplus P2)^{-2}(P2(K'1)) \oplus (P1 \oplus P2)^{-2}(P1(K'2)) = G2(K'1, K'2)$$

As described above, in KeygenAssist, (w3⊕y3) is used as input of SubWord(RotWord( )) function. This value is based on the $4^{th}$ word of K1, w3. With codependent keys, the $4^{th}$ words of K1 and K2 are computed using G1 and G2, the SubWord(RotWord(( )) function is then applied to the $4^{th}$ words and finally F1 is applied on these two words. In key recombine, the same is done for the first SubWord(RotWord(( )) function. For the second function, F2 is applied on the two $4^{th}$ words instead of F1.

Furthermore, $P(SubWord(RotWord((P^{-1})))$ can be used and F1, F2, G1, and G2 can be modified accordingly:

$$F'1 = P(F1(P^{-1}(K1), P^{-1}(K2)))$$

$$F'2 = P(F2(P^{-1}(K1), P^{-1}(K2)))$$

$$G'1 = P(G1(P^{-1}(K1), P^{-1}(K2)))$$

$$G'2 = P(G2(P^{-1}(K1), P^{-1}(K2)))$$

The above method enables to have all intermediate values protected by a linear function.

In some embodiments when a key K that is stored in a masked way following the equation:

$$K = K' \oplus M$$

where K is the cipher key, M is a mask value, and K' is the masked key stored in memory. The disclosed embodiments can be used to compute the key schedule of K using the key schedule of K' and the value of the mask M. This approach keeps 12 amongst 16 of the bytes of K masked during the computation.

The tools provided by the embodiments described above, enable computing key schedules in a dependent, masked way. Since the scheduling of a dynamic key is one of the weak points of a white box AES computation, it should be protected as well, and the disclosed embodiments enables to do so in an innovative way.

The computation cost of this method is slightly larger than twice the expansion of a key, since the non-linear part should be computed three times for each round, instead of twice. However this overhead is quite negligible, compared to the overall cost of the AES execution.

The security added by this method protects in a better way than two key schedules. The main difference in computing two key schedules using the disclosed embodiments instead of doing two independent white box key expansions is that to attack the second key, it is necessary to break both key schedules, which is not the case in two independent computations. Also, in the disclosed codependent key schedules, it is necessary to break the two key schedules to break any one of the two keys. Overall, the security improvements largely compensate for the small computation cost overhead.

The disclosed embodiments explained how it is possible to compute multiple key schedules at the same time, in the case of the AES. Only the non-linear part (e.g., the SubWord (RotWord( )) function) is computed separately, and it was shown how to do it without revealing the key data involved in it. The rest of the sub-keys are computed without being unmasked at any point.

The disclosed embodiments also show how it is possible to compute sub keys that have linear operators on them, which enables to have more complex masked keys used. In particular, having codependent key schedules is possible here, and enables to have complex functions of the keys as inputs to the key scheduling algorithm. To conclude, it is also possible to compute the key schedule of K1 and K1⊕K2, and to use the output only for a white box representation of AES with key K2. This is equivalent to a dynamic masking of K2.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
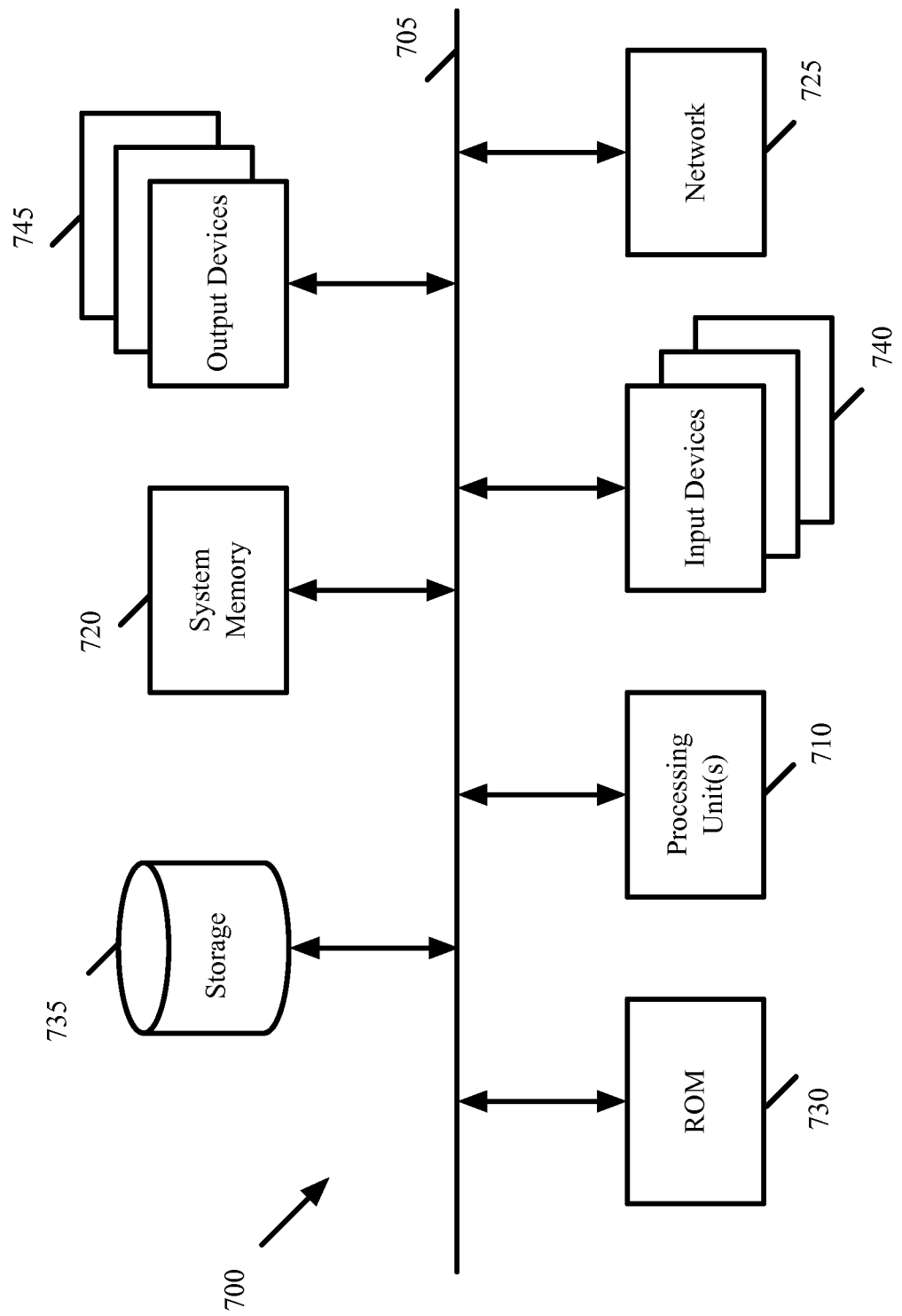
FIG. 7 conceptually illustrates an electronic system with which some embodiments of the invention are implemented.

FIG. 7 conceptually illustrates another example of an electronic system 700 with which some embodiments of the invention are implemented. The electronic system 700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 700 includes a bus 705, processing unit(s) 710, a system memory 720, a network 725, a read-only memory (ROM) 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 720, and the permanent storage device 735.

From these various memory units, the processing unit(s) 710 retrieves instructions to execute and data to process in order to execute the processes of the invention. The processing unit(s) may be a single processor or a multi-core processor in different embodiments.

The read-only-memory 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive, integrated flash memory) as the permanent storage device 735.

Other embodiments use a removable storage device (such as a floppy disk, flash memory device, etc., and its corresponding drive) as the permanent storage device. Like the permanent storage device 735, the system memory 720 is a read-and-write memory device. However, unlike storage device 735, the system memory 720 is a volatile read-and-write memory, such a random access memory. The system memory 720 stores some of the instructions and data that the processor needs at runtime. In some embodiments, the invention's processes are stored in the system memory 720, the permanent storage device 735, and/or the read-only memory 730. For example, the various memory units include instructions for processing multimedia clips in accordance with some embodiments. From these various memory units, the processing unit(s) 710 retrieves instructions to execute and data to process in order to execute the processes of some embodiments.

The bus 1105 also connects to the input and output devices 740 and 745. The input devices 740 enable the user to communicate information and select commands to the electronic system. The input devices 740 include alphanumeric keyboards and pointing devices (also called "cursor control devices"), cameras (e.g., webcams), microphones or similar devices for receiving voice commands, etc. The output devices 745 display images generated by the electronic system or otherwise output data. The output devices 745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 7, bus 705 also couples electronic system 700 to a network 725 through a network adapter (not shown). In this manner, the computer can be a part of a network of computers (such as a local area network ("LAN"), a wide area network ("WAN"), or an Intranet), or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures such as FIG. 2 conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for preventing a potential attacker from extracting keys of a cryptographic process performed on a computing device, the method comprising:
    at the computing device, receiving an encrypted computer readable message comprising media content;
    at the computing device, receiving first and second cipher keys of a digital right management (DRM) application, wherein the potential attacker has control over an execution of the DRM application on the computing device;
    for a plurality of rounds, generating a first set of subkeys corresponding to the first cipher key as a function of the first cipher key;
    for the plurality of rounds, generating a second set of subkeys corresponding to the second cipher key, wherein for each round after a first round, a subkey of the second set of subkeys is a function of (i) a first subkey of the first set of subkeys from a previous round and (ii) a second subkey of the second set of subkeys from the previous round; and
    decrypting the media content by performing the cryptographic process using the generated sets of subkeys.

2. The method of claim 1, wherein receiving the first and second cipher keys comprises:
    receiving a first input comprising the first cipher key masked by a first input masking value; and
    receiving a second input comprising the second cipher key, masked by a second masking value, and masked by the first cipher key.

3. The method of claim 1, wherein generating the first set of subkeys corresponding to the first cipher key comprises generating a subkey for each of the plurality of rounds of the cryptographic process.

4. The method of claim 1, wherein generating the second set of subkeys corresponding to the second cipher key comprises, for the first round of the cryptographic process, setting a first subkey for the second set of subkeys to the second cipher key masked by a masking value.

5. The method of claim 1, wherein generating the second set of subkeys comprises performing a set of nonlinear operations to generate the subkey of the second set of subkeys of each round after the first round, the set of nonlinear operations comprising:
    a nonlinear function of a portion of the first subkey of the first set of subkeys from the previous round masked by a first masking value; and
    a nonlinear function of (i) a portion of the first subkey of the first set of subkeys from the previous round masked by (ii) a portion of the second subkey of the second set of subkeys from the previous round masked by (iii) the first masking value masked by (iv) a second masking value.

6. The method of claim 5, wherein the set of nonlinear operations further comprises a function to substitute bytes of the subkey according to a substitution table.

7. The method of claim 1, wherein the cryptographic process is advanced encryption standard (AES).

8. A non-transitory machine readable medium storing a program which when executed by at least one processing unit of a computing device prevents a potential attacker from extracting keys of a cryptographic process performed on the computing device, the program comprising sets of instructions for:
    at the computing device, receiving an encrypted computer readable message comprising media content;
    at the computing device, receiving first and second cipher keys of a digital right management (DRM) application, wherein the potential attacker has control over an execution of the DRM application on the computing device;
    for a plurality of rounds, generating a first set of subkeys corresponding to the first cipher key as a function of the first cipher key;
    for the plurality of rounds, generating a second set of subkeys corresponding to the second cipher key, wherein for each round after a first round, a subkey of the second set of subkeys is a function of (i) a first subkey of the first set of subkeys from a previous round and (ii) a second subkey of the second set of subkeys from the previous round; and decrypting the media content by performing the cryptographic process using the generated sets of subkeys.

9. The non-transitory machine readable medium of claim 8, wherein the set of instructions for receiving the first and second cipher keys comprises sets of instructions for:
receiving a first input comprising the first cipher key masked by a first input masking value; and
receiving a second input comprising the second cipher key, masked by a second masking value, and masked by the first cipher key.

10. The non-transitory machine readable medium of claim 8, wherein the set of instructions for generating the first set of subkeys corresponding to the first cipher key comprises a set of instructions for generating a subkey for each of the plurality of rounds of the cryptographic process.

11. The non-transitory machine readable medium of claim 8, wherein the set of instructions for generating the second set of subkeys corresponding to the second cipher key comprises a set of instructions for setting, for the first round of the cryptographic process, a first subkey for the second set of keys f to the second cipher key masked by a masking value.

12. The non-transitory machine readable medium of claim 8, wherein the set of instructions for generating the second set of subkeys comprises a set of instructions for performing a set of nonlinear operations to generate the subkey of the second set of subkeys of each round after the first round, the set of nonlinear operations comprising:
a nonlinear function of a portion of the first subkey of the first set of subkeys from the previous round masked by a first masking value; and
a nonlinear function of (i) a portion of the first subkey of the first set of subkeys from the previous round masked by (ii) a portion of the second subkey of the second set of subkeys from the previous round masked by (iii) the first masking value masked by (iv) a second masking value.

13. The non-transitory machine readable medium of claim 12, wherein the set of nonlinear operations further comprises a function to substitute bytes of the subkey according to a substitution table.

14. The non-transitory machine readable medium of claim 8, wherein the cryptographic process is advanced encryption standard (AES).

15. A computing device comprising:
a set of processing units; and
a non-transitory machine readable medium storing a program which when executed by at least one of the processing units of the computing device prevents a potential attacker from extracting keys of a cryptographic process performed on the computing device, the program comprising sets of instructions for:
at the computing device, receiving an encrypted computer readable message comprising media content;
at the computing device, receiving first and second cipher keys of a digital right management (DRM) application, wherein the potential attacker has control over an execution of the DRM application on the computing device;
for a plurality of rounds, generating a first set of subkeys corresponding to the first cipher key as a function of the first cipher key;
for the plurality of rounds, generating a second set of subkeys corresponding to the second cipher key, wherein for each round after a first round, a subkey of the second set of subkeys is a function of (i) a first subkey of the first set of subkeys from a previous round and (ii) a second subkey of the second set of subkeys from the previous round; and
decrypting the media content by performing the cryptographic process using the generated sets of subkeys.

16. The device of claim 15, wherein the set of instructions for receiving the first and second cipher keys comprises sets of instructions for:
receiving a first input comprising the first cipher key masked by a first input masking value; and
receiving a second input comprising the second cipher key, masked by a second masking value, and masked by the first cipher key.

17. The device of claim 15, wherein the set of instructions for generating the first set of subkeys corresponding to the first cipher key comprises a set of instructions for generating a subkey for each of the plurality of rounds of the cryptographic process.

18. The device of claim 15, wherein the set of instructions for generating the second set of subkeys corresponding to the second cipher key comprises a set of instructions for setting, for the first round of the cryptographic process, a first subkey for the second set of keys f to the second cipher key masked by a masking value.

19. The device of claim 15, wherein the set of instructions for generating the second set of subkeys comprises a set of instructions for performing a set of nonlinear operations to generate the subkey of the second set of subkeys of each round after the first round, the set of nonlinear operations comprising:
a nonlinear function of a portion of the first subkey of the first set of subkeys from the previous round masked by a first masking value; and
a nonlinear function of (i) a portion of the first subkey of the first set of subkeys from the previous round masked by (ii) a portion of the second subkey of the second set of subkeys from the previous round masked by (iii) the first masking value masked by (iv) a second masking value.

20. The device of claim 19, wherein the set of nonlinear operations further comprises a function to substitute bytes of the subkey according to a substitution table.

* * * * *